(12) United States Patent
Xia et al.

(10) Patent No.: US 11,366,707 B2
(45) Date of Patent: Jun. 21, 2022

(54) MESSAGE TRANSMISSION METHOD AND APPARATUS, DEVICE AND MEDIUM

(71) Applicant: BAIDU ONLINE NETWORK TECHNOLOGY (BEIJING) CO., LTD., Beijing (CN)

(72) Inventors: Liming Xia, Beijing (CN); Zhuo Chen, Beijing (CN); Zhongjun Ni, Beijing (CN); Wanyu Bao, Beijing (CN); Ronggui Peng, Beijing (CN); Yuedong Dang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/534,093

(22) Filed: Aug. 7, 2019

(65) Prior Publication Data

US 2020/0073736 A1 Mar. 5, 2020

(30) Foreign Application Priority Data

Aug. 30, 2018 (CN) .......................... 201811001827.9

(51) Int. Cl.
*G06F 9/54* (2006.01)
(52) U.S. Cl.
CPC .............. *G06F 9/546* (2013.01); *G06F 9/542* (2013.01)
(58) Field of Classification Search
CPC ................................. G06F 9/542; G06F 9/546
USPC ................................................. 719/313, 318
See application file for complete search history.

(56) References Cited

U.S. PATENT DOCUMENTS

| 7,539,989 | B2 * | 5/2009 | Blackmore | G06F 9/544 |
| | | | | 718/100 |
| 7,802,071 | B2 * | 9/2010 | Oved | G06F 13/28 |
| | | | | 711/170 |
| 2006/0083172 | A1 | 4/2006 | Jordan et al. | |

FOREIGN PATENT DOCUMENTS

| CN | 105760525 A | 7/2016 |
| CN | 106130882 A | 11/2016 |
| CN | 107566437 A | 1/2018 |
| CN | 108196834 A | 6/2018 |
| CN | 108390933 A | 8/2018 |

OTHER PUBLICATIONS

Office Action for CN application No. 201811001827.9, dated Dec. 2, 2020, 8 pages.
English translation of Office Action for CN application No. 201811001827.9, dated Dec. 2, 2020, 14 pages.

* cited by examiner

*Primary Examiner* — Andy Ho
(74) *Attorney, Agent, or Firm* — Fay Sharpe LLP

(57) ABSTRACT

The present application provides a message transmission method and apparatus, a device and a medium. The method includes: determining and outputting, by an issuing task, a data message, storing the data message in a preset storage space, and sending an issuing notification message; and reading, by a subscription task, the data message from the preset storage space according to the issuing notification message. With embodiments of the present disclosure, transmission efficiency of the data message between the issuing task and the subscription task may be improved, and source occupancy may be reduced.

15 Claims, 2 Drawing Sheets determining and outputting, by an issuing task, a data message, storing the data message in a preset storage space; sending, by the issuing task, the issuing notification message to a program interface of the subscription task in a broadcast way, in a multicast way or in a unicast way —— S210 reading, by a subscription task, the data message from the preset storage space according to the issuing notification message —— S220

MESSAGE TRANSMISSION METHOD AND APPARATUS, DEVICE AND MEDIUM

CROSS-REFERENCE TO RELATED APPLICATION

The present application is based upon and claims priority to Chinese Patent Application No. 201811001827.9, filed on Aug. 30, 2018, the entirety contents of which are incorporated herein by reference.

FIELD

The present disclosure relates to a field of computer processing technology, and more particularly to a message transmission method and apparatus, a device and a medium.

BACKGROUND

An automatic vehicle system is an important application in a field of artificial intelligence. In the automatic vehicle system, a plurality of function modules corresponding to different functions may be operated, and the respective function modules are implemented by programs with or without a matched hardware device. A typical function module may be such as, a driver module, a perception module and a planning module. For example, the perception module may also be subdivided into an image perception module, a laser point cloud perception module, and an ultrasound beam perception module. Different automatic vehicle systems may be provided with different function modules due to different hardware devices or different software functions In the related art, each function module corresponds to a processing task. The respective processing tasks are responsible for processing various types of data generated in real time. For example, a perception task of the perception module may process collected perception data when the collected perception data is received in real time. The processing tasks may need data interaction or data message transmission. For example, route data outputted by a planning task of the planning module may be taken as a route message, to be provided for a driving task of the driver module, thus achieving a control of the driving. A processing task for outputting the data message may be called as an issuing task. A processing task for obtaining the outputted data message as input data may be called as a subscription task. Respective subscription tasks determine an issuing-subscription relation based on respective functions.

In the automatic vehicle system, both the issuing task and the subscription task transmit the data message based on a shared memory. At present, a common way is to start up a thread by the subscription task to ceaselessly perform polling on the shared memory to determine whether there is a new data message. This manner causes idling of polling threads of a plurality of the subscription task and resources wasted, which is even worse when multiple subscription tasks subscribe a data message of a certain issuing task at the same time.

SUMMARY

Embodiments of the present disclosure provide a message transmission method, a device and a medium.

According to an embodiment of the present disclosure, a message transmission method is provided. The method includes: determining and outputting, by an issuing task, a data message, storing the data message in a preset storage space, and sending an issuing notification message; and reading, by a subscription task, the data message from the preset storage space according to the issuing notification message.

According to an embodiment of the present disclosure, a device is provided. The device includes: a memory; a processor and a computer program stored in the memory and operated in the processor. When the processor executes the computer program, the message transmission method according to any of embodiments of the present disclosure is implemented.

According to an embodiment of the present disclosure, a computer readable storage medium is provided. The computer readable storage medium has a computer program stored thereon, and when the computer program is executed, the message transmission method according to any of embodiments of the present disclosure is implemented.

DETAILED DESCRIPTION

Description of the present disclosure will be made in detail below with reference to accompanying drawings and embodiments. It should be understood that, specific embodiments described herein are merely intended to explain the present disclosure and should not be understood as a limitation of the present disclosure. In addition, it also should be noted that, for ease of description, the accompanying drawings merely illustrate a part but not all of the structures associated with the present disclosure.

Embodiment 1

Figure 1:
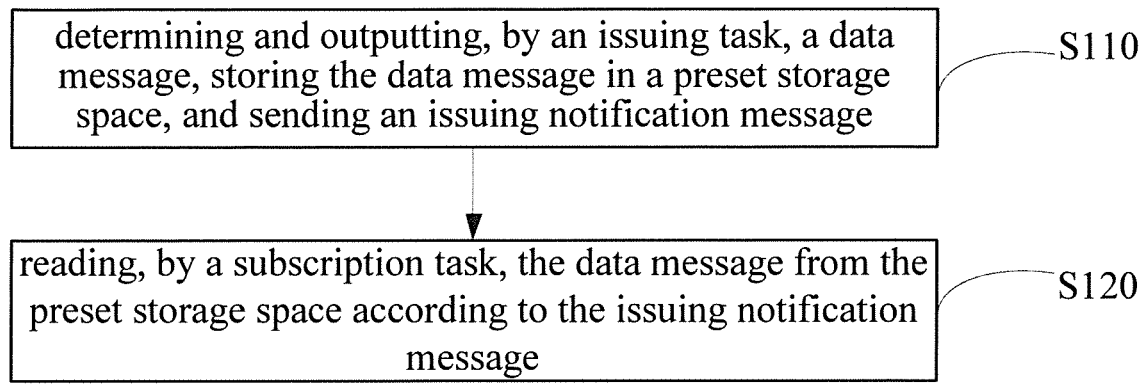
FIG. 1 is a flow chart illustrating a message transmission method provided by Embodiment 1 of the present disclosure.

FIG. 1 is a flow chart illustrating a message transmission method provided by Embodiment 1 of the present disclosure. This embodiment may be applied to a scenario of transmitting a data message among different function modules, and more particularly to a scenario of transmitting the data message among respective function module contained in an automatic vehicle system. The method may be executed by a message transmission apparatus provided by embodiments of the present disclosure. The apparatus may be implemented in a form of software and/or hardware, and may be usually integrated in an in-vehicle device such as a control device for an automatic driving vehicle. As illustrated in FIG. 1, the method of the embodiment includes followings.

At block S110, an issuing task determines and output a data message, stores the data message in a preset storage space, and sends an issuing notification message.

Generally, one system may include multiple function modules. Each function module corresponds to a processing task. The function module may be a module of a combination of software and hardware or only the software for implementing a preset function. The processing task may be a task for implementing the preset function. The processing task may include the issuing task and a subscription task based on different roles. Each processing task may issue or subscribing the data message with other processing tasks in the two roles. In detail, the issuing task may be a processing task for outputting the data message. The processing task may be loaded in a thread, a process, or a co-routine, for example. An electronic device invokes a processor to execute the thread, the process, or the co-routine, to execute the loaded processing task. By configuring a corresponding code at a corresponding program segment of the processing task, an operation function of the processing task is realized when the data message is sent and subscribed.

The preset storage space is configured to store the data message provided by the issuing task. The preset storage space is a storage space applied in advance. The issuing notification message is configured to notify that a processing task of the function module subscribing the outputted data message may obtain the outputted data message.

After or at the same time that the data message is stored in the storage space, the notification message may be sent to a function module which needs the data message, such that the function module which needs the data message obtains the data message from the storage space.

At block S120, a subscription task reads the data message from the preset storage space according to the issuing notification message.

In detail, the subscription task may be a processing task for obtaining the outputted data message as inputted data. The issuing task corresponds to the subscription task. The subscription task and the issuing task are determined based on a flow direction of the data message. In other words, whether the processing task of the function module is the issuing task or the subscription task is not fixed. For example, a module A collects image data, and converts the image data into a data message to be stored in the preset storage space. The module A is an issuing module, and the processing task is the issuing task. At the same time, the module A obtains a control message from the preset storage space, and performs a task instruction for collecting the image based on the control message. At this time, the module A is a subscription module, and the processing task is the subscription task.

In this embodiment, the issuing task and the subscription task are processing tasks corresponding to the function modules in the automatic vehicle system during the data message is transmitted, that is, the subscription task and the issuing task are any processing task in the automatic vehicle system. The automatic vehicle system includes at least one of: at least one image perception task, a laser point cloud perception task, a planning task and a driver task.

The image perception task may be a task for collecting an image of ambient surrounding a vehicle. For example, pedestrians and objects such as traffic lights, traffic signs and traffic markings may be recognized by a camera. The laser point cloud perception task refers to a task for measuring a distance between the vehicle and a target object, and for recording the distance by points. Each point includes three-dimensional coordinates, and further includes color information or reflection intensity information. For example, a distance between the vehicle and the traffic light may be measured by a laser radar. The planning task may be a task that the automatic vehicle plans a real-time driving route and a real-time driving behavior. The driver task may be a task for controlling the automatic vehicle according to the planned route and the planned driving behavior. The driving behavior includes a behavior for avoiding an obstacle.

The way that the subscription task reads the data message from the preset storage space may be to search in a memory space notified in advance by the issued task, and may also be to search and read the subscribed data message according to additional information carried by the issuing notification message. The additional information may include a message identifier, a message storage address, a timestamp and the like, such that the data message may be obtained accurately and timely, thereby improving the efficiency for transmitting the data message and improving reliability for transmitting the data message simultaneously.

Alternatively, the subscription task reading the data message from the preset storage space according to the issuing notification message includes: obtaining, by the subscription task, a message identifier in the issuing notification message when the subscription task receives the issuing notification message; and reading, by the subscription task, the data message from the preset storage space in response to the message identifier in the issuing notification message being matched with a message identifier in a preset subscribed message of the subscription task.

In detail, the message identifier includes a name of the data message (such as an image collection message), an address name of the preset storage space (an address name of the storage space applied in advance by the issuing task), a name of the issuing task and the like. Based on the message identifier carried by the data message, the subscription task may determine whether the data message is the subscribed target data message. For example, the message identifier carried by the data message is compared with a preset message identifier, if the message identifier carried by the data message is the preset message identifier, the data message is read; otherwise, the data message is not read, thus avoiding an occupation of the thread to read the data message.

Alternatively, the subscription task reads the data message from the preset storage space according to the issuing notification message includes: reading, by the subscription task, the data message from a storage unit of which a storage address is matched with a message storage address in the issuing notification message according to the message storage address.

In detail, the preset storage space may include a plurality of storage units each of which has a detailed storage address. Each storage address may correspond to a data message. Therefore, the detailed way for obtaining the data message may be to search for a storage unit matching with the message storage address from the preset storage space according to the data message, and read the data message from the storage unit. In this way, it may be avoided that a whole storage space is traversed to search for an address storing the data message, thus improving the efficiency of transmitting the data message.

Alternatively, the subscription task reads the data message from the preset storage space according to the issuing notification message, including: obtaining, by the subscription task, a timestamp of the data message from the issuing notification message; and reading, by the subscription task, the data message from the preset storage space, and storing the data message in a massage queue based on the timestamp, in which, the subscription task processes the data message according to a sequence of messages in the message queue.

In detail, the timestamp may be a moment when the data message is generated. Usually, one function module may correspond to a plurality of issuing tasks. Each issuing task may send the data message, and receive an amount of messages finally. The function module may not process all the data messages at the same time. For example, respective data message is sorted according to the timestamps of the data messages. When the subscribed data message is received, the data message may be inputted to a position matched with the timestamp in the message queue according to the timestamp of respective data message, such that the function module may process respective data message in sequence according to the sequence of messages in the message queue. By providing the timestamp in the data message, respective data message may be processed sequentially, avoiding processing the data messages disorderly.

In addition, the timestamp may also be used to fuse the messages. For example, the planning task needs to simultaneously take the data message outputted by the image perception task and the data message outputted by the laser point cloud perception task as the inputted data. When the difference between the timestamps of the two data messages obtained by the planning task is 10 minutes, the two obtained data messages do not have an associated reference meaning actually, and may not be simultaneously taken as the inputted data of the planning task to enable that the planning task plans the vehicle driving route. In this case, an associated reference of data messages from different issuing tasks within a preset time period may be determined based on timestamp information, thus avoiding that the function module obtains a false execution result based on false fusion information, and improving the reliability for executing the processing task.

With embodiments of the present disclosure, the issuing notification message is sent when the data message corresponding to the issuing task is stored in the preset storage space, such that the subscriber timely reads the data message from the preset storage space according to the issuing notification message, thereby solving idling of polling threads of the subscription task and resource wasting resulting from constantly polling the shared memory to determine whether there is a new data message in the related art. In this way, the subscriber subscribing the data message is actively notified at the same time of the data message being sent, thereby avoiding the polling threads of the subscription task being executed constantly, improving the transmission efficiency of the data message between the issuing task and the subscription task and reducing the resource occupancy.

Embodiment 2

Figure 2:
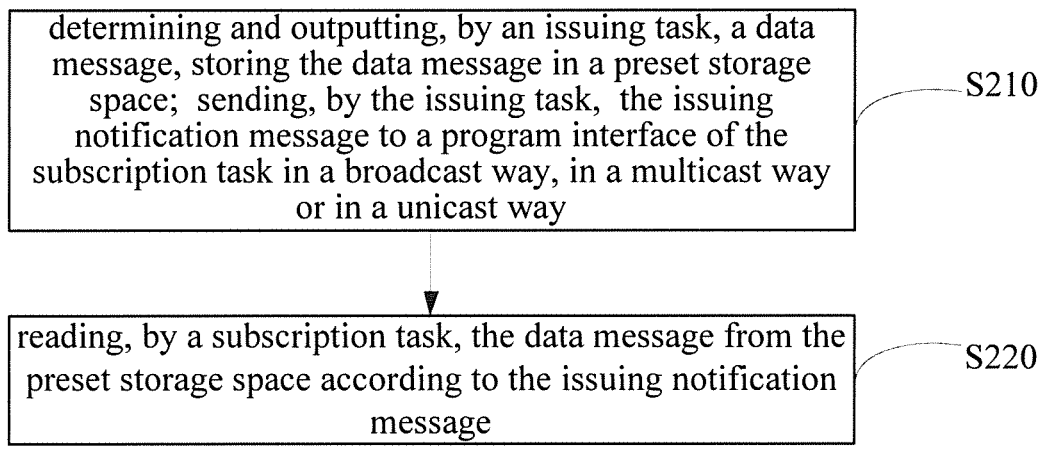
FIG. 2 is a flow chart illustrating a message transmission method provided by Embodiment 2 of the present disclosure.

FIG. 2 is a flow chart illustrating a message transmission method provided by Embodiment 2 of the present disclosure. In this embodiment, further descriptions are made based on Embodiment 1 of the present disclosure, in which the issuing task sending the issuing notification message specifically by: sending the issuing notification message to a program interface of the subscription task in a broadcast way, in a multicast way or in a unicast way. As illustrated in FIG. 2, the method includes followings.

At block S210, an issuing task determines and outputs a data message, stores the data message in a preset storage space, and sends an issuing notification message, and the issuing task sends the issuing notification message to a program interface of the subscription task in a broadcast way, in a multicast way or in a unicast way.

In detail, in the broadcast way, the data message is sent to all the subscription tasks. In the multicast way, the data message is sent to subscription tasks within a preset range. The subscription tasks within the preset range may be subscription tasks subscribing the data message, or may be set as needed. In the unicast way, the data message is sent to one subscription task. The issuing task sends the issuing notification message to a subscription task which needs the data message according to a preset notification way. It should be noted that, the subscription task may be different every time, but a subscription relation is fixed. For example, the subscription relation refers to a correspondence between the issuing task and a plurality of subscription tasks satisfying a subscription condition. However, the subscription task satisfying the subscription condition may be different in each time.

Generally, the subscription relation may be determined after the processing task is established, which is fixed usually. However, the subscription relation may be adjusted according to user needs, subsequent optimization or system upgrade, etc.

At block S220, a subscription task reads the data message from the preset storage space according to the issuing notification message.

The issuing task, the subscription task, the data message, the issuing notification message and the preset storage space in this embodiment may refer to the description of the above embodiment.

Alternatively, the subscription task and the issuing task are executed by threads respectively, and the preset storage space is a shared memory space.

In the system, the system distributes the threads for respective function module to execute the processing task corresponding to respective function module. The shared memory space may be a physical memory shared by a plurality of processes. The processes are combined by one or more threads. The shared memory space may be read and written directly during respective thread executes the corresponding processing task, thus improving efficiency of information communication. Since a plurality of function modules may simultaneously subscribe the data message outputted by a same issuing task, that is, a plurality of subscription tasks may simultaneously subscribe the data message outputted by one issuing task, the plurality of subscription tasks may read the subscribed data message from the memory space through the shared memory space.

Alternatively, before the issuing task sends the issuing notification message to the program interface of the subscription task in the multicast way, the method further includes: determining, by the issuing task, at least two subscription tasks corresponding to the issuing task to form a multicast group of the issuing notification message according to a task topology relation; or forming, by the issuing task, a multicast group corresponding to the issuing notification message according to a task networking relation of a physical layer or a task networking relation of an operation system layer.

In detail, the task topology relation refers to a message transmission relation among respective processing task. The subscription tasks belonging to a same message transmission relation may be put into a same multicast group. For example, the data message outputted by the sensing task may be subscribed by the driver task and the planning task. A multicast group of the perception tasks may be formed for the driving task and the planning task.

Optionally, the multicast group may also be determined according to a physical structure relation of the function module, and a software associated relation of the function module. The physical layer may refer to a layer where all the physical devices locate, including hardware devices such as networks, communication facilities, and computer systems. The layer is a physical basic of the system, and provides a hardware connection channel for data interaction with the physical device in the system. For example, processing tasks of function modules connected to a same communication bus may be determined as a multicast group. An operation system layer performs a schedule and a distribution on hardware sources in the physical layer, and performs accessing and protection for information, which is an operation basic of other software in the upper layer.

Generally, the processing task is a program or a program segment. Some programs need to be implemented by a hardware. For example, in an image processing, in a case that an actuation program of a camera interacts with other processing task, the interaction for data transmission needs be performed through the bus. In this case, the multicast group needs to determine a member in the multicast group according to the physical layer, that is, a connection relation among the hardware.

In another aspect, the task networking relation may be determined according to a message transmission relation among respective processing task in the operation system layer, thereby determining the member of the multicast group.

By determining the member of the multicast group according to the task topology relation, the task networking relation of the physical layer or the task networking relation of the operation system layer, the subscription task may be flexibly determined as needs, the subscription relation may be satisfied maximally, the thread is reasonably used, and resource wasting is avoided.

With embodiments of the present disclosure, the subscription task is notified as needs in the broadcast way, in the multicast way or in the unicast way, which improves pertinence flexibility of the issuing notification message. In this way, the resource is used reasonably in a case that the subscription is satisfied, and the transmission efficiency of the data message between the issuing task and the subscription task is improved.

Embodiment 3

Figure 3:
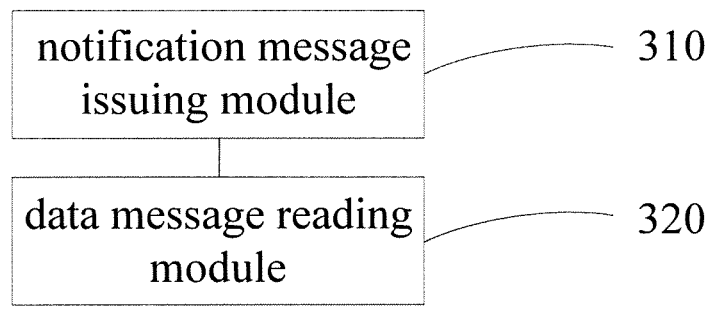
FIG. 3 is a block diagram illustrating a message transmission apparatus provided by Embodiment 3 of the present disclosure.

FIG. 3 is a block diagram illustrating a message transmission apparatus provided by Embodiment 3 of the present disclosure. The message transmission apparatus is provided in an in-vehicle device. As illustrated in FIG. 3, the apparatus includes: a notification message issuing module 310 and a data message reading module 320.

The notification message issuing module 310 is configured to determine and output, by an issuing task, a data message, store the data message in a preset storage space, and send an issuing notification message.

The data message reading module 320 is configured to read, by a subscription task, the data message from the preset storage space according to the issuing notification message.

With embodiments of the present disclosure, the issuing notification message is sent when the data message corresponding to the issuing task is stored in the preset storage space, such that the subscriber timely reads the data message from the preset storage space according to the issuing notification message, thereby solving idling of polling threads of the subscription task and resource wasting resulting from constantly polling the shared memory to determine whether there is a new data message in the related art. In this way, the subscriber subscribing the data message is actively notified at the same time of the data message being sent, thereby avoiding that the polling threads of the subscription task being executed constantly, improving the transmission efficiency of the data message between the issuing task and the subscription task and reducing resource occupancy.

Further, the notification message issuing module 310 is configured to send, by the issuing task, the issuing notification message to a program interface of the subscription task in a broadcast way, in a multicast way or in a unicast way.

Further, the apparatus is configured to determine, by the issuing task, at least two subscription tasks corresponding to the issuing task to form a multicast group of the issuing notification message according to a task topology relation; or form, by the issuing task, a multicast group corresponding to the issuing notification message according to a task networking relation of a physical layer or a task networking relation of an operation system layer.

Further, the data message reading module 320 is configured to obtain, by the subscription task, a message identifier in the issuing notification message when the subscription task receives the issuing notification message; and read, by the subscription task, the data message from the preset storage space in response to the message identifier in the issuing notification message being matched with a message identifier in a preset subscribed message of the subscription task.

Further, the data message reading module 320 is configured to read, by the subscription task, the data message from a storage unit of which a storage address is matched with a message storage address in the issuing notification message according to the message storage address.

Further, the data message reading module 320 is configured to obtain, by the subscription task, a timestamp of the data message from the issuing notification message; and read, by the subscription task, the data message from the preset storage space, and store the data message in a massage queue based on the timestamp, in which, the subscription task processes the data message according to a sequence of messages in the message queue.

Further, the subscription task and the issuing task are executed by threads respectively, and the preset storage space is a shared memory space.

Further, the subscription task and the issuing task are processing tasks in an automatic vehicle system; and the automatic vehicle system includes at least one of: at least one image sensing task, a laser point cloud sensing task, a planning task and a driving task.

The above message transmission apparatus may execute the message transmission method provided according to any of embodiments of the present disclosure, and have corresponding function modules for executing the message transmission method and beneficial effect Embodiment 4

Figure 4:
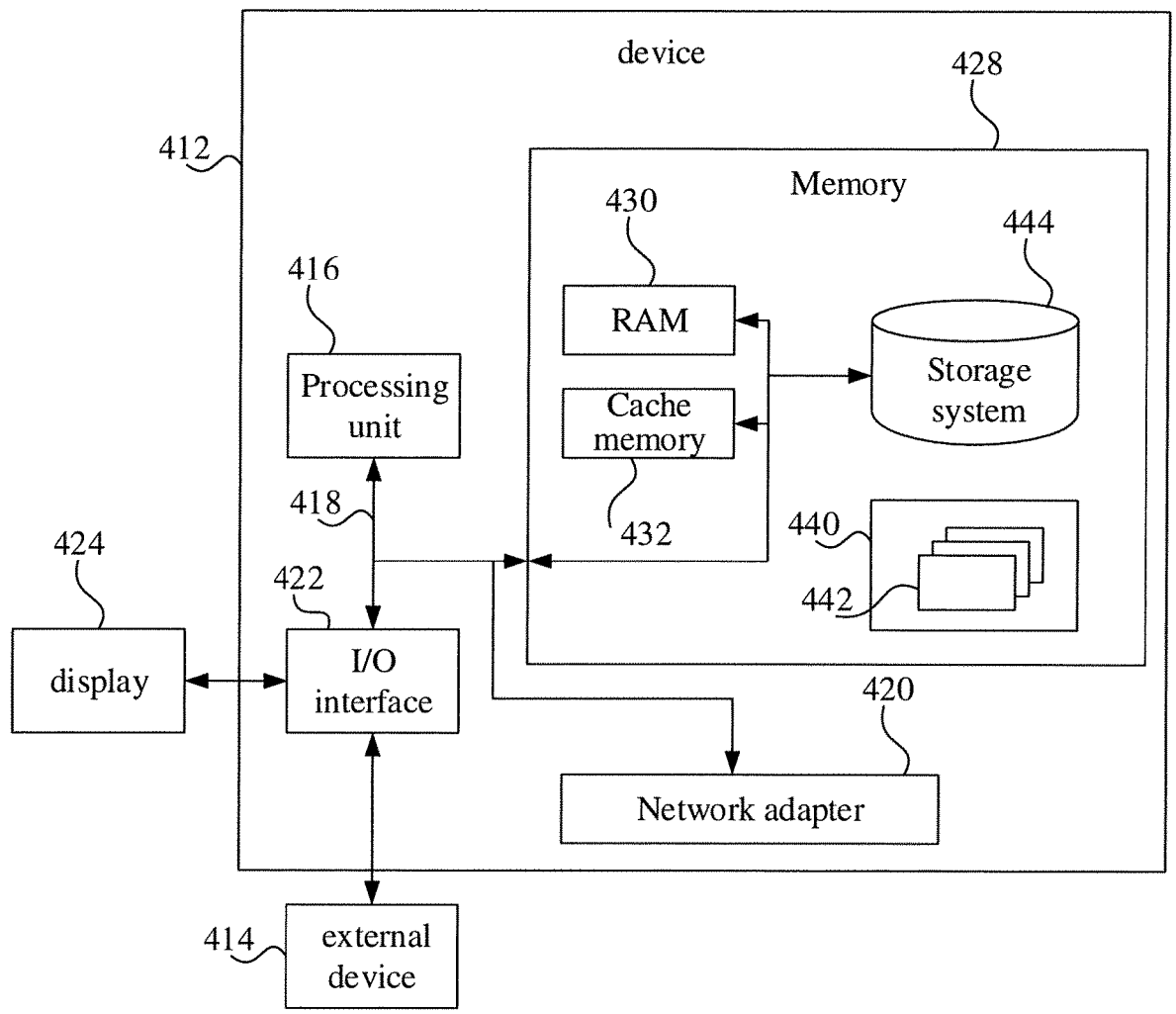
FIG. 4 is a schematic diagram illustrating a device provided by Embodiment 4 of the present disclosure.

FIG. 4 is a schematic diagram illustrating a device provided by Embodiment 4 of the present disclosure. FIG. 4 illustrates a block diagram for implementing the exemplary device 412 applied to implement implementations of the present disclosure. The device 412 illustrated in FIG. 4 is merely an example, which may not bring any limitation to functions and scope of embodiments of the present disclosure.

As illustrated in FIG. 4, the device 412 is embodied in the form of a general-purpose computer device. Components of the device 412 may include but be not limited to: one or more processors or processing units 416, a system memory 428, and a bus 418 connecting different system components (including the system memory 428 and the processing unit 416). The device 412 may be an in-vehicle device.

The bus 418 represents one or more of several bus structures, including a storage bus or a storage controller, a peripheral bus, an accelerated graphics port, and a processor or a local bus of any bus structure in the plurality of bus structures. For example, these architectures include but are not limited to an ISA (Industry Standard Architecture) bus, a MAC (Micro Channel Architecture) bus, an enhanced ISA bus, a VESA (Video Electronics Standards Association) local bus and a PCI (Peripheral Component Interconnection) bus.

The device 412 typically includes various computer system readable mediums. These mediums may be any usable medium that may be accessed by the device 412, including volatile and non-volatile mediums, removable and non-removable mediums.

The system memory 428 may include computer system readable mediums in the form of volatile medium, such as a Random Access Memory (RAM) 430 and/or a cache memory 432. The device 412 may further include other removable/non-removable, volatile/non-volatile computer system storage mediums. Only as an example, the storage system 444 may be configured to read from and write to non-removable, non-volatile magnetic mediums (not illustrated in FIG. 4, which is usually called "a hard disk driver"). Although not illustrated in FIG. 4, a magnetic disk driver configured to read from and write to the removable non-volatile magnetic disc (such as "a floppy disk"), and an optical disc driver configured to read from and write to a removable non-volatile optical disc (such as a Compact Disc Read Only Memory (CD-ROM), a Digital Video Disc Read Only Memory (DVD-ROM) or other optical mediums) may be provided. Under these circumstances, each driver may be connected with the bus 418 by one or more data medium interfaces. The memory 428 may include at least one program product. The program product has a set of program modules (for example, at least one program module), and these program modules are configured to execute functions of respective embodiments of the present disclosure.

A program/utility tool 440, having a set (at least one) of program modules 442, may be stored in the memory 428. Such program modules 442 include but not limited to an operating system, one or more application programs, other program modules, and program data. Each or any combination of these examples may include an implementation of a networking environment. The program module 442 usually executes functions and/or methods described in embodiments of the present disclosure.

The device 412 may communicate with one or more external devices 414 (such as a keyboard, a pointing device, a display 424), may further communicate with one or more devices enabling a user to interact with the device 412, and/or may communicate with any device (such as a network card, and a modem) enabling the device 412 to communicate with one or more other computer devices. Such communication may occur via an Input/Output (I/O) interface 422. Moreover, the device 412 may further communicate with one or more networks (such as a Local Area Network (LAN), a Wide Area Network (WAN) and/or a public network, such as Internet) via a network adapter 420. As illustrated in FIG. 4, the network adapter 420 communicates with other modules of the device 412 via the bus 418. It should be understood that, although not illustrated in FIG. 4, other hardware and/or software modules may be used in combination with the device 412, including but not limited to: a microcode, a device driver, a redundant processing unit, an external disk drive array, a RAID (Redundant Array of Independent Disks) system, a tape drive, a data backup storage system, etc.

The processor 416, by operating programs stored in the system memory 428, executes various function applications and data processing. For example, the message transmission method provided by embodiments of the present disclosure is implemented.

That is, the processing unit executes the program to implement: determining and outputting, by an issuing task, a data message, storing the data message in a preset storage space, and sending an issuing notification message; and reading, by a subscription task, the data message from the preset storage space according to the issuing notification message.

Embodiment 5

Embodiment 5 of the present disclosure further provides a computer readable storage medium having a computer program stored thereon. When the program is executed by the processor, the message transmission method provided by embodiments of the present disclosure is implemented. The method includes: determining and outputting, by an issuing task, a data message, storing the data message in a preset storage space, and sending an issuing notification message; and reading, by a subscription task, the data message from the preset storage space according to the issuing notification message.

The computer storage medium involved in embodiments of the present disclosure may employ any combination of one or more computer readable mediums. The computer readable medium may be a computer readable signal medium or a computer readable storage medium. A computer readable storage medium may be, for example, but not limited to an electronic, magnetic, optical, electromagnetic, infrared, or semiconductor system, apparatus, or device, or any suitable combination of the foregoing. More specific examples (a non-exhaustive list) of the computer-readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The data signal transmitted may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing an operation of the present disclosure may be programmed by using one or more program languages or the combination thereof. The program language includes an object-oriented programming language, such as Java, Smalltalk, C++, further includes a conventional procedural programming language, such as a C programming language or a similar programming language. The computer program codes may execute entirely on the computer of the user, partly on the computer of the user, as a stand-alone software package, partly on the computer of the user and partly on a remote computer, or entirely on a remote computer or a server. In the scenario related to the remote computer, the remote computer may be connected to the user's computer through any type of network, including a local area network (LAN) or a wide area network (WAN), or be connected to an external computer (for example, through the Internet using an Internet Service Provider).

It should be noted that the above are only preferred embodiments of the present disclosure and the applicable technical principles. The skilled in the related art may understand that, the present disclosure does not limit to the specific embodiments described herein. Various apparent changes, adjustment and substitutions can be made to the present disclosure without departing from the spirit and scope of the present disclosure for the skilled in the related art. Therefore, although detailed illustration is made to the present disclosure based on the foregoing embodiments, the present disclosure is not only limited to the foregoing embodiments. More equivalent embodiments may be further included without departing from the scope of conception of the present disclosure, and the scope of the present disclosure is determined by the claims that follow.

What is claimed is:

1. A message transmission method, comprising:
   determining and outputting, by an issuing task, a data message, storing the data message in a preset storage space, and simultaneously sending an issuing notification message to a subscription task to notify the subscription task obtaining the data message from the preset storage space directly; and
   reading, by the subscription task, the data message from the preset storage space according to the issuing notification message, comprising: obtaining, by the subscription task, a timestamp of the data message from the issuing notification message, wherein the timestamp is configured to fuse the data messages to determine an associated reference of data message from different issuing tasks within a preset time period, so as to cause a function module preventing from obtaining a false execution result based on false fusion information.

2. The method according to claim 1, wherein, sending, by the issuing task, the issuing notification message comprises:
   sending, by the issuing task, the issuing notification message to a program interface of the subscription task in at least one of a broadcast way, a multicast way and a unicast way.

3. The method according to claim 2, before sending, by the issuing task, the issuing notification message to the program interface of the subscription task in the multicast way, further comprising at least one of:
   determining, by the issuing task, at least two subscription tasks corresponding to the issuing task to form a multicast group of the issuing notification message according to a task topology relation; and
   forming, by the issuing task, a multicast group corresponding to the issuing notification message according to at least one of a task networking relation of a physical layer and a task networking relation of an operation system layer.

4. The method according to claim 1, wherein, reading, by the subscription task, the data message from the preset storage space according to the issuing notification message comprises:
   obtaining, by the subscription task, a message identifier in the issuing notification message when the subscription task receives the issuing notification message; and
   reading, by the subscription task, the data message from the preset storage space in response to the message identifier in the issuing notification message being matched with a message identifier in a preset subscribed message of the subscription task.

5. The method according to claim 1, wherein, reading, by the subscription task, the data message from the preset storage space according to the issuing notification message comprises:
   reading, by the subscription task, the data message from a storage unit of which a storage address is matched with a message storage address in the issuing notification message according to the message storage address.

6. The method according to claim 1, wherein, reading, by the subscription task, the data message from the preset storage space according to the issuing notification message comprises:
   reading, by the subscription task, the data message from the preset storage space, and storing the data message in a message queue based on the timestamp, in which, the subscription task processes the data message according to a sequence of messages in the message queue.

7. The method according to claim 1, wherein, the subscription task and the issuing task are executed by threads respectively, and the preset storage space is a shared memory space.

8. The method according to claim 1, wherein, the subscription task and the issuing task are processing tasks in an automatic vehicle system; and the automatic vehicle system comprises at least one of: at least one image sensing task, a laser point cloud sensing task, a planning task and a driving task.

9. The method according to claim 2, wherein, the subscription task and the issuing task are executed by threads respectively, the preset storage space is a shared memory space, the subscription task and the issuing task are processing tasks in an automatic vehicle system; and the automatic vehicle system comprises at least one of: at least one image sensing task, a laser point cloud sensing task, a planning task and a driving task.

10. The method according to claim 3, wherein, the subscription task and the issuing task are executed by threads respectively, the preset storage space is a shared memory space, the subscription task and the issuing task are processing tasks in an automatic vehicle system; and the automatic vehicle system comprises at least one of: at least one image sensing task, a laser point cloud sensing task, a planning task and a driving task.

11. The method according to claim 4, wherein, the subscription task and the issuing task are executed by threads respectively, the preset storage space is a shared memory space, the subscription task and the issuing task are processing tasks in an automatic vehicle system; and the automatic vehicle system comprises at least one of: at least one image sensing task, a laser point cloud sensing task, a planning task and a driving task.

12. The method according to claim 5, wherein, the subscription task and the issuing task are executed by threads respectively, the preset storage space is a shared memory space, the subscription task and the issuing task are processing tasks in an automatic vehicle system; and the automatic vehicle system comprises at least one of: at least one image sensing task, a laser point cloud sensing task, a planning task and a driving task.

13. The method according to claim 6, wherein, the subscription task and the issuing task are executed by threads respectively, the preset storage space is a shared memory space, the subscription task and the issuing task are processing tasks in an automatic vehicle system; and the automatic vehicle system comprises at least one of: at least one image sensing task, a laser point cloud sensing task, a planning task and a driving task.

14. A device, comprising:
one or more processors;
a storage device, configured to store one or more programs;
wherein when the one or more programs are executed by the one or more processors, the one or more processors are caused to implement a message transmission method, and the method comprises: determining and outputting, by an issuing task, a data message, storing the data message in a preset storage space, and simultaneously sending an issuing notification message to a subscription task to notify the subscription task obtaining the data message from the preset storage space directly; and reading, by the subscription task, the data message from the preset storage space according to the issuing notification message, comprising: obtaining, by the subscription task, a timestamp of the data message from the issuing notification message, wherein the timestamp is configured to fuse the data messages to determine an associated reference of data message from different issuing tasks within a preset time period, so as to cause a function module preventing from obtaining a false execution result based on false fusion information.

15. A non-statutory computer readable storage medium having a computer program stored thereon, wherein, the computer program is configured to be executed to implement a message transmission method, and the method comprises: determining and outputting, by an issuing task, a data message, storing the data message in a preset storage space, and simultaneously sending an issuing notification message to a subscription task to notify the subscription task obtaining the data message from the preset storage space directly; and reading, by the subscription task, the data message from the preset storage space according to the issuing notification message, comprising: obtaining, by the subscription task, a timestamp of the data message from the issuing notification message, wherein the timestamp is configured to fuse the data messages to determine an associated reference of data message from different issuing tasks within a preset time period, so as to cause a function module preventing from obtaining a false execution result based on false fusion information.

* * * * *